H. R. McCONNELL.
MACHINE FOR MAKING CORKSCREWS.
APPLICATION FILED APR. 5, 1915.

1,238,166.

Patented Aug. 28, 1917.
6 SHEETS—SHEET 3.

Witnesses
W. W. Williams
A. I. Hind

Inventor
H. R. McConnell
By Watson E. Coleman
Attorney

H. R. McCONNELL.
MACHINE FOR MAKING CORKSCREWS.
APPLICATION FILED APR. 5, 1915.

1,238,166.

Patented Aug. 28, 1917.
6 SHEETS—SHEET 4.

Witnesses
W. A. Williams
A. J. Hurd

Inventor
H. R. McCONNELL

By
Watson E. Coleman
Attorney

H. R. McCONNELL.
MACHINE FOR MAKING CORKSCREWS.
APPLICATION FILED APR. 5, 1915.

1,238,166.

Patented Aug. 28, 1917.
6 SHEETS—SHEET 6.

UNITED STATES PATENT OFFICE.

HARRY R. McCONNELL, OF RICHMOND, VIRGINIA, ASSIGNOR TO AMERICAN CORKSCREW COMPANY, OF RICHMOND, VIRGINIA.

MACHINE FOR MAKING CORKSCREWS.

1,238,166.  Specification of Letters Patent.  Patented Aug. 28, 1917.

Application filed April 5, 1915. Serial No. 19,260.

*To all whom it may concern:*

Be it known that I, HARRY R. MCCONNELL, a citizen of the United States, residing at Richmond, in the county of Henrico and State of Virginia, have invented certain new and useful Improvements in Machines for Making Corkscrews, of which the following is a specification, reference being had to the accompanying drawings.

My invention relates to machines for bending and forming wire, and particularly to machines for making small wire corkscrews.

The primary object of my invention is to provide a machine which will not only form the ordinary small wire corkscrew with looped handle and twisted shank, but will also form, from the same length of wire, a resilient or flexible clip or arm adapted to partially embrace the neck of a bottle and hold the corkscrew in conjunction therewith.

Another object of my invention is to improve the general construction of machines of this character, rendering them more positive and efficient in action, and reducing and simplifying the parts thereof, as will be fully brought out in the following specification.

My invention is illustrated in the accompanying drawings, wherein—

Corresponding and like parts are referred to in the following description and designated in all parts of the accompanying drawings by like reference numerals.

Figures 1, 11:
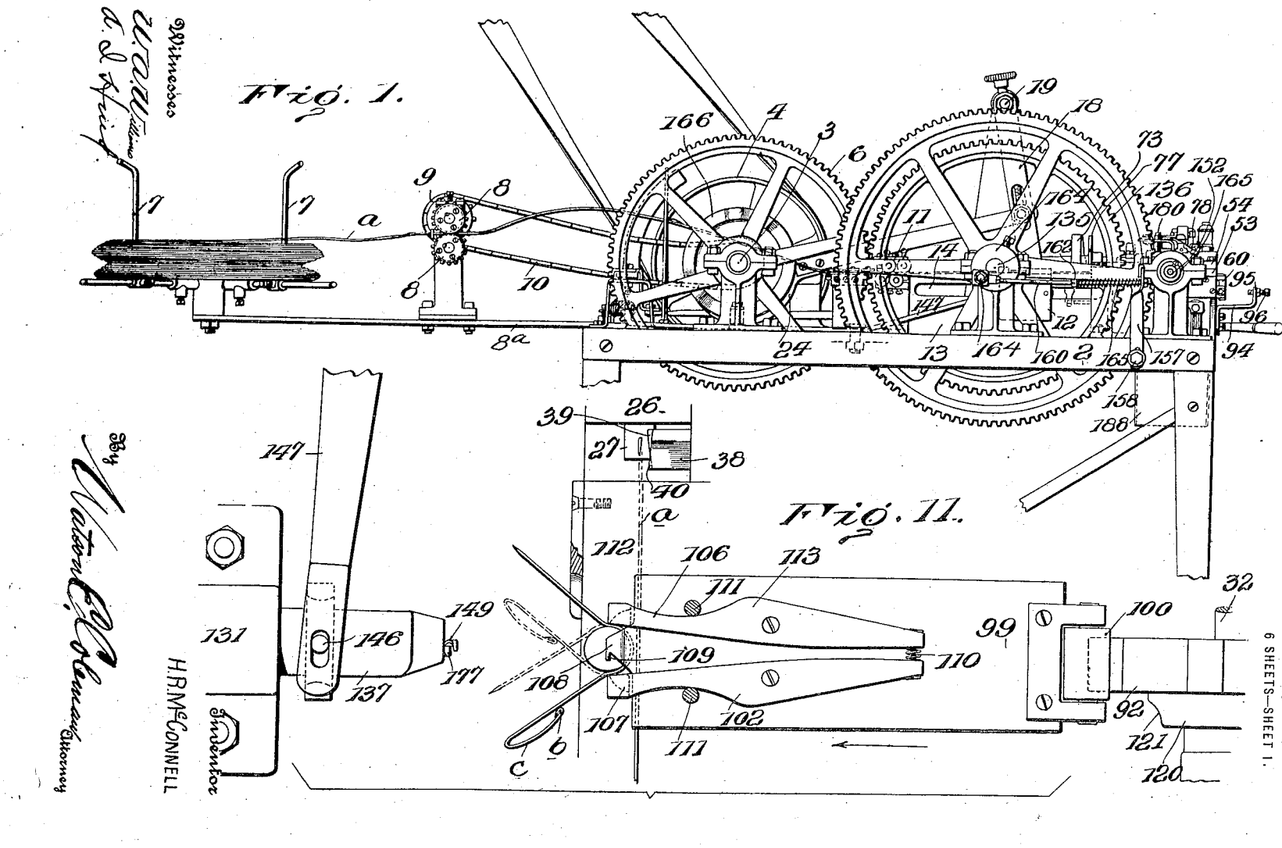
Figure 1 is a fragmentary side elevation of my improved machine.
Fig. 11 is a plan view of the mechanism for forming the handle loop.
Figures 2, 12, 13:
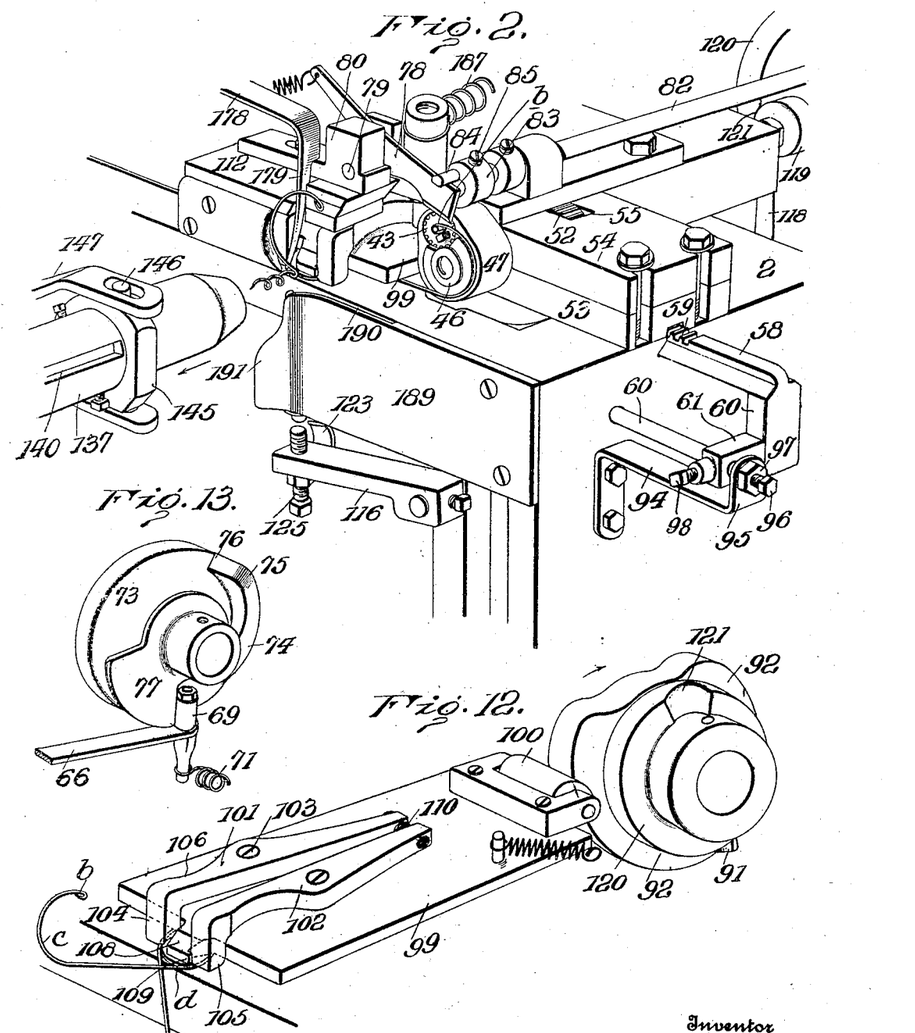
Fig. 2 is a fragmentary perspective view of the table, and showing the wire bending mechanism.
Fig. 12 is a perspective view of the mechanism illustrated in Fig. 11.
Fig. 13 is a perspective view of the cam shown in Fig. 7 for returning the initial wire bending mechanism to its normal position.
Figure 3:
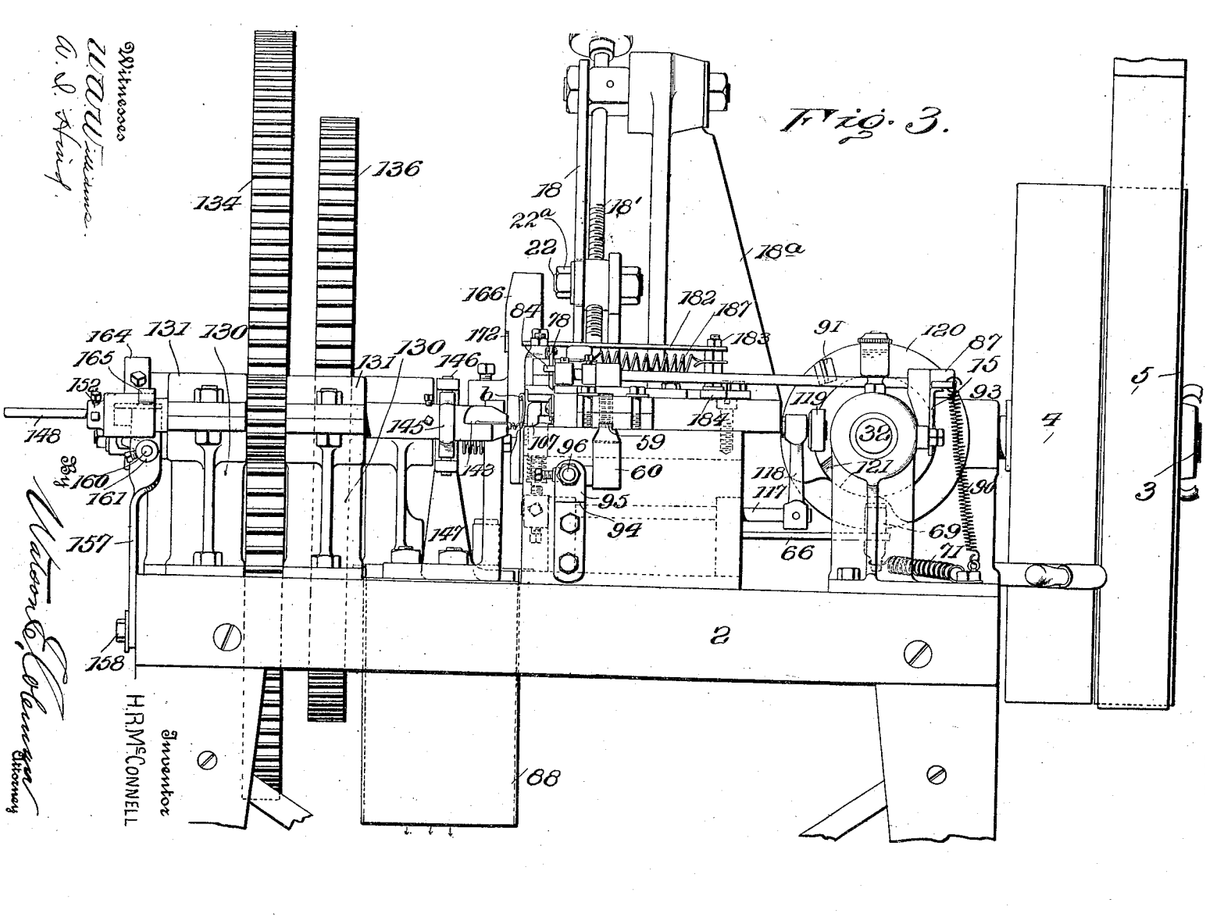
Fig. 3 is an end elevation of the machine.

Referring to these figures, and particularly to Figs. 1, 2 and 3, 2 designates a table or other solid base upon which the mechanism is mounted. Mounted in suitable pillar blocks or other necessary bearings disposed upon the top of the table 2 is a transverse main or driving shaft 3, which, at one end, as illustrated in Fig. 3, is provided with the driving band wheels 4 and 5 upon which a belt is placed, the belt being of course shiftable from one band wheel to the other, one of these band wheels being idle. Mounted upon the shaft 3 is the toothed gear wheel 6 whereby power is communicated to the wire bending mechanism, as will be later stated.

Figure 5:
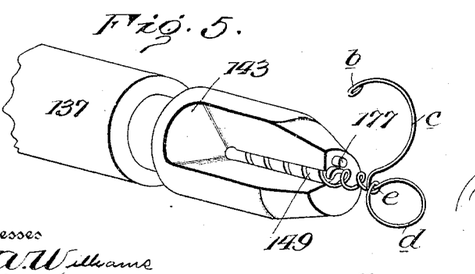
Fig. 5 is a perspective detail view of the means for forming the helical shank of the corkscrew.
Figure 6:
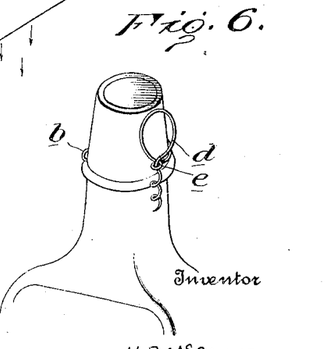
Fig. 6 is a perspective view of a bottle with the corkscrew in conjunction therewith.

This machine is adapted to form a corkscrew of the character shown in Fig. 6 from a continuous line of wire, the wire being fed forward intermittently as it is needed, cut off into suitable lengths and the end of the length so cut off then given an initial bend to form an embracing arm. The looped handle is then formed by the mechanism illustrated in Fig. 11 and in Figs. 5 and 9, the shank of the corkscrew then being bent to form a helix by the mechanism illustrated in Fig. 5.

The wire from which the corkscrew is made is preferably coiled upon a reel designated generally 7, this reel being rotatably mounted upon a supporting member 8ª which extends outward and is attached to the table. It will be understood that this supporting member 8ª may be of itself supported in any suitable manner and that the detailed construction of the reel 7 may be varied in any desired manner, this reel 7 not being an essential part of my invention.

The wire a after it leaves the reel 7 passes between two straightening rolls 8. These rolls have intermeshing teeth, and are illustrated as driven by a sprocket wheel 9, in turn driven from the main shaft by means of a sprocket chain 10. From the straightening rolls 8 the wire passes between a set of rolls 11 and to a feed slide 12. This slide is U-shaped in cross section and is disposed astride of a vertical track 13 which is longitudinally slotted as at 14, as shown most clearly in Figs. 4 and 7, the slide being provided with rollers 15 operating within the slot 14 so as to secure a steady and easy sliding movement for the slide upon the track. The depending side members of the slide engage the track snugly so as to prevent any lateral movement of the slide.

Figure 4:
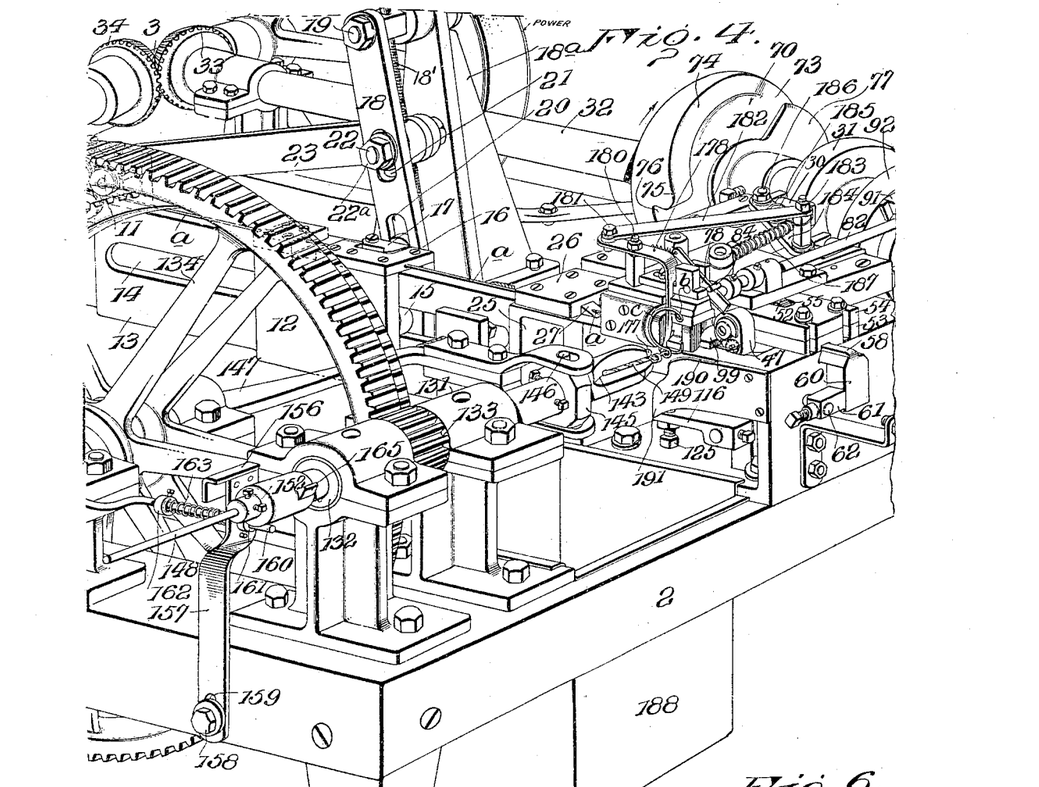
Fig. 4 is a perspective view of the wire feeding, bending, and coiling portions of my machine.

Preferably the upper member of the slide is detachably connected to the depending members thereof, as by means of screws, as shown in Fig. 4. This upper member, which is designated 16, is longitudinally pierced for the passage of the wire a, as shown most clearly in Fig. 7, and is recessed upon its upper face for the reception of a dog 17. This dog, as shown, is pivoted at its rear end and is provided at its forward end with a tooth adapted to engage the wire. Upon a forward movement of the slide this tooth will engage the wire and draw the wire longitudinally forward with the slide. Upon a rearward movement of the slide, however, the dog will release the wire and the wire will remain stationary while the slide moves rearward. The slide is reciprocated by any suitable mechanism, but as shown this mechanism consists of a lever 18 which is pivotally supported at its upper end upon a bolt or shaft 19, which at its lower end is slotted as at 20 for the reception of a pin and roller projecting from the slide and entering the slot. The middle portion of the lever 18 is also slotted as at 21 to provide for the reception of a wrist pin 22 projecting from an eccentric rod 23. This eccentric extends rearward and carries upon it the usual eccentric ring 24 which surrounds an eccentric mounted upon the shaft 3, this eccentric, however, not being illustrated.

The lever 18 is held in place upon the wrist pin 22 by means of a nut 22ª or like device, and it is obvious that the throw of the slide may be adjusted by shifting the wrist pin up or down the slot 21 by means of the screw 18'. The bolt 19 is supported upon a standard 18ª.

The forward end of the track 13 terminates against a raised supporting bed, designated generally 25, upon whose upper face is detachably mounted a clamp plate 26, in which is mounted a cutting member 27 whose beveled face is perforated for the passage of the wire a, as shown clearly in Fig. 4. Coacting with this beveled faced cutting member 27 and reciprocating transversely thereto and against the edge of the block 26 is a cutting knife, illustrated in Fig. 8 and designated 28. This knife has one or more beveled faces which will coact with the beveled face of the member 27, and the knife is supported in a reciprocating plate or slide 29, the rear end of which is bifurcated and carries a roller 30 engaging with a cam 31 mounted upon a shaft 32 which extends longitudinally of the machine. This shaft 32, as illustrated in Fig. 4, extends rearward and carries upon it a beveled gear wheel 33 intermeshing with a beveled gear wheel 34 mounted upon the shaft 3. While I do not wish to limit myself to any specific manner of mounting the knife 28 in the slide or plate 29, I preferably recess one corner of the plate as at 35, this recess being formed with a vertically disposed tongue 36, and I preferably form the shank of the knife with opposed recesses 37, either of which will engage with the tongue. The forward end of the knife is beveled, on opposite faces as at 38, and 39, and the end face of the knife is also formed with two beveled faces 40, these beveled faces extending diagonally with relation to each other. The beveled faces 38 and 39 of course conform to the bevel of the member 27 and there are two beveled faces provided so that the knife may be turned over in its slide 29 when one of the cutting edges gets dull. This knife exerts a shearing cut upon the wire a so that the wire is cut off diagonally to its longitudinal axis, and thus the opposite ends of each length of wire are beveled or sharpened, as shown most clearly in Fig. 11.

The knife blade is retracted and the roller 30 held against the cam 31 by means of a lever 18ª which is connected to a post 42 projecting upward from the plate 29. (See Fig. 8.) This lever is in turn urged to a position to carry the roller 30 against the cam 31 by means of a spring 18⁷, as shown in Fig. 4.

Figures 7, 8, 9:
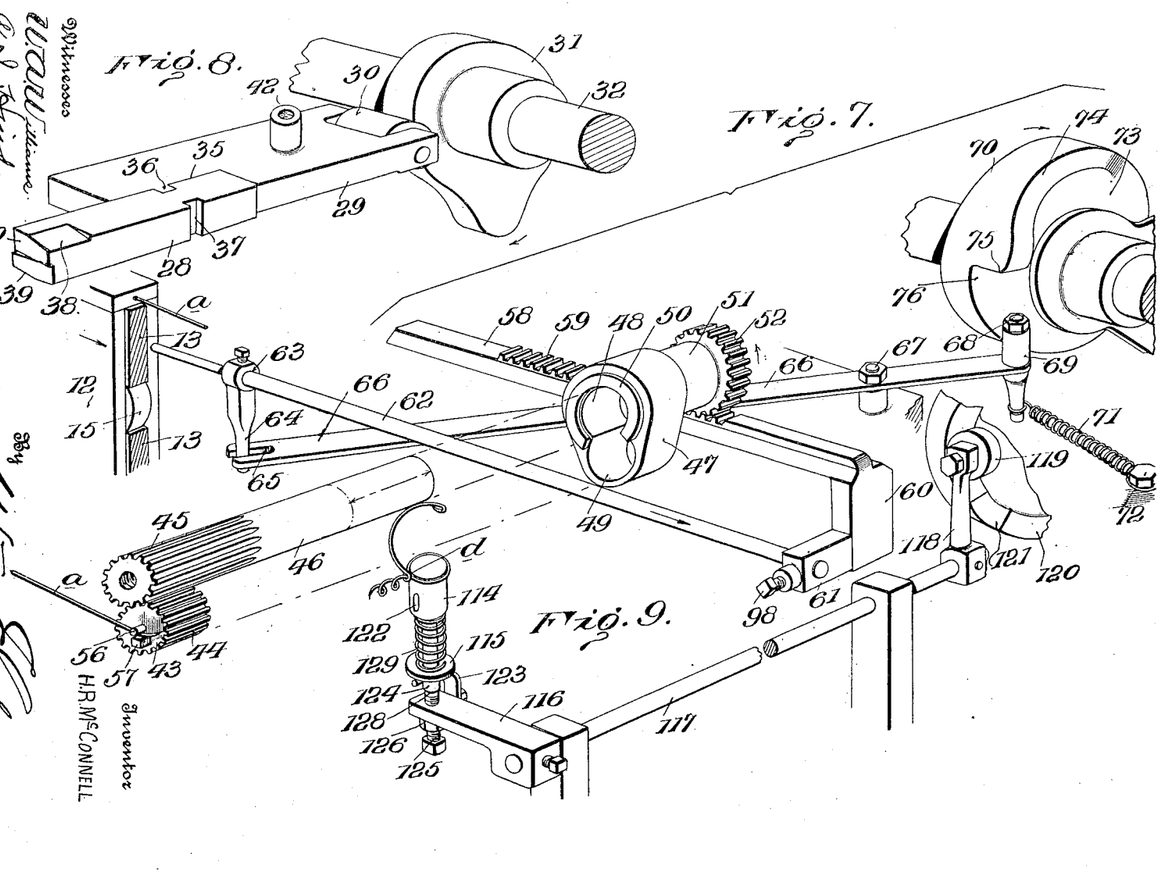
Fig. 7 is a perspective view of the mechanism for forming the initial loop or bend in the handle of the corkscrew.
Fig. 8 is a fragmentary perspective view of the wire cutter and its actuating cam.
Fig. 9 is a fragmentary perspective view of the loop mandrel and the actuating cam therefor.

Before the wire is cut off by the shearing blade 28 the extremity of the wire is engaged between studs projecting from a bending roller 43, illustrated most clearly in Fig. 7. This roller 43 carries upon its end an axially projecting round stud 56 and an eccentrically disposed rectangular stud 57 which is spaced from the round stud a very slight distance, the function of these studs to be later described. The roller 43 is formed with peripheral teeth 44, these teeth meshing with peripheral teeth 45 formed upon a fixed and elongated roller 46. The roller 43 not only rotates upon its own axis, but also has a planetary motion around the roller 46, and to this end both the rollers 43 and 46 are mounted in a housing or head 47, which is most clearly shown in Fig. 7. The head 47 is formed with two partially cylindrical bores or seats 48 and 49, intersecting each other and receiving the shafts 46 and 43. Disposed upon the end face of the head, and disposed concentrically to the bore which incloses the shaft 46 is a projecting rib 50, which is spaced from the margin of the head or housing in order to receive the wire $a$, as shown in Fig. 2, and which acts as a mandrel.

Forming part of the head 47 and extending therefrom in alinement with the seat 48 is a sleeve 51, having at its end the gear wheel 52, and this sleeve 51 is rotatably supported in suitable bearings formed by the plates 53 and 54, as shown clearly in Fig. 2, which are folded upon the table. The plate 54 is slotted as at 55, and through this slot the gear wheel 52 projects, as illustrated in Fig. 2.

It will now be seen that a rotation of the head 47 in a counter-clockwise direction will carry the gear wheel 44 around the axis of the gear wheel 45, and that at the same time, the roller 46 being fixed, the roller 43 will be caused to rotate upon its own axis, thus having a planetary motion with relation to the roller 46.

As before stated, the roller 43 is provided with a centrally disposed axial round stud 56, and with an eccentrically disposed rectangular stud 57, as shown most clearly in Fig. 7. The pointed end of the wire $a$ is inserted between these studs, and as the roller 43 moves in a counter-clockwise direction around the roller 46 the wire will be drawn around the forming rib 50 so as to form an approximately semi-circular bend in the wire and at the same time the rotation of the roller 43 will cause the wire to be formed at its extremity with a small loop $b$, as clearly shown in Fig. 2, this loop being also indicated in Fig. 5. It is at the moment this bend $c$ is formed with the loop $b$ that the cutter 28 operates to shear the wire $a$, thereby cutting off a length of wire the end of which has been previously bent in the manner just before stated.

For the purpose of rotating the sleeve 51 at its proper time I provide a rack-bar 58, as clearly shown in Fig. 7, this rack-bar being formed upon its upper face with the teeth 59 which engage with the gear wheel 52. This rack-bar has downwardly turned ends 60, and the forward end is formed with a laterally projecting arm 61 through which the rod 62 extends, this rod being parallel to the rack-bar 58, the extremity of the rod being so disposed that it is in the path of movement of the slide 12.

Mounted upon this rod is a collar 63 held in an adjusted position thereon by a set-screw, this collar having a depending pin 64 which engages in the slot 65 formed in the extremity of a lever 66. This lever 66 is pivoted upon a stud 67, as illustrated in Fig. 7, and at its outward end is provided with an upwardly projecting stud 68 surrounded by a sleeve 69. This sleeve engages against the cam face of a cam 70. The lower end of the pin 68 extends below the lever 66, and operatively connected thereto is a coiled spring 71, in turn connected at its other end to a pin 72 on the frame whereby the outer or short end of the lever is normally drawn toward the pin 72 and the long end of the lever is forced toward the slide 12, thus holding the extremity of the rod 62 in contact with the slide 12. The cam 70 is formed with a face 73 which is in the same plane as the rear face of the cam for a portion of the circumference of the cam, and then rises at 74 to a point 75, and then suddenly descends as at 76 to the plane of the face 73 of the cam. The cam rotates in the direction of the arrow, Fig. 7, and acts to positively limit the movement of the lever 66 and positively return this lever to its initial position, that is, the position shown in Fig. 7, if the spring 71 is too weak for this purpose, or if for any reason the mechanism does not act positively to return to its initial position.

The rod 62 and the rack-bar 58 are shifted in one direction, that is the direction of the arrow in Fig. 7, by reason of the forward movement of the slide 12. This will expand the spring 71 and also cause the roller 69 to travel against the face of the cam 70. Thus at the time that the slide 12 is moved forward the rack bar 58 is also moved forward, and the head 47 is given a rotation in the direction of the arrow, which is shown in Fig. 7 as conjoined with the gear 52, thus winding the wire $a$ around the mandrel formed by the flange or rib 50, as illustrated in Fig. 2. Upon the rearward movement of the slide 12 the spring 71 will cause the rod 62 to follow the slide rearward, and at the same time the cam 74 will also bear against the roller 69 and cause the positive rearward movement of the inner end of the arm 66. In order to provide for a positive movement of the arm 66 under the action of the spring 71, I provide in conjunction with the cam face 73 a shield 77, shown most clearly in Fig. 13, which shield is segmental in form and spaced from the face 73 of the cam 70 a distance just sufficient to permit the passage of the roller 69 between the inner face of the shield and the face of the cam.

It will be seen that this segmental shield is disposed just in front of the beginning of the cam portion 74, but that the roller 69 escapes the shield when the cam is so turned that the cam portion 74 engages the roller. As soon as the shield 77 has passed the roller 69 the spring 71 will act to retract the adjacent end of the lever 66 and throw the rod 62 rearward to follow up the rearwardly moving slide 12.

Figures 10, 14, 15:
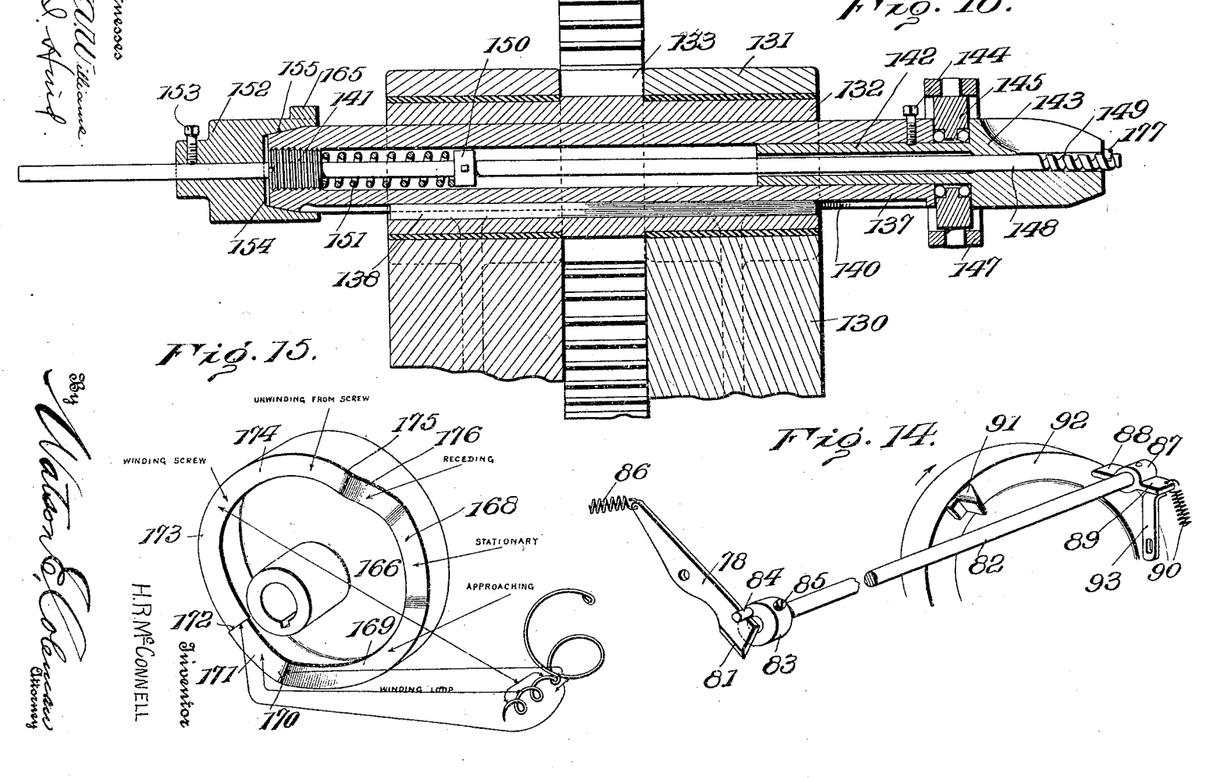
Fig. 10 is a longitudinal sectional view of the mechanism for twisting the shank of the corkscrew.
Fig. 14 is a fragmentary perspective view of the means for disengaging the wire from the forming mechanism illustrated in Fig. 2, this view also showing in perspective the means for actuating this disengaging mechanism.
Fig. 15 is a perspective view of the cam for actuating the screw shank forming mechanism.

For the purpose of ejecting the partially formed corkscrew from the forming head 47, I mount in conjunction with this head a pivoted ejecting blade, illustrated most clearly in Figs. 2 and 14, this blade being designated 78. The blade 78 is pivotally mounted on trunnions 79 carried in upwardly projecting supporting ears 80 formed upon a supporting casing, which will be later described. This blade, as shown most clearly in Fig. 14, is pivoted at its middle and has its outer end formed with a beveled under edge face, this beveled edge being designated 81. When the forward end of the blade is depressed this beveled edge is inserted between the wire loop $b$ and the face of the roller 43 and wedges the wire loop outward so that it is forced off of the studs 56 and 57. For the purpose of actuating the ejecting blade 78, I have provided a shaft 82 which carries at its end adjacent said blade a head 83 formed with a projecting pin 84 disposed eccentrically to the axis of the shaft 82. This head 83 may be adjusted upon the shaft and is held in position by means of a set screw 85. The pin 84 is slightly flattened on its inner face and engages with the upper edge of the blade 78. Upon a rotation or partial rotation of the shaft 82 this pin 84 will depress the beveled edge of the blade into the position mentioned and lift the rear end of the blade against the force of the spring 86, the rear end of which is fixedly supported in any suitable manner upon the frame of the machine. An oscillation of the shaft 82 is secured by mounting upon the shaft at its end a head 87 having oppositely disposed wings 88 and 89, one of these wings being connected to a coiled spring 90 whose lower end is fixed in any suitable manner, the other wing projecting into the path of a beveled faced lug 91 mounted upon a rotatable element 92 which in turn is mounted upon the shaft 32. This lug 91 is so disposed with reference to the cam 70 that as soon as the loops $b$ and $c$ have been formed the lug will engage the wing 88, oscillating the shaft 82, and cause the blade 78 to be depressed, thus forcing the partially formed wire off of the lugs. The shaft is limited in its rotation under the action of the spring 90 by means of an adjustable stop 93 which is operatively supported upon the table in any suitable manner, and which contacts with the wing 89 when the shaft is in the position shown in Fig. 14.

It may also be mentioned at this point that the forward movement of the rack bar 58 is limited by a stop illustrated in Fig. 2. To this end a bracket 94 is mounted upon the table or otherwise operatively supported, the outer end of this bracket being upwardly turned as at 95, and adjustably mounted in this upwardly turned end is a screw pin 96 held in place by means of set nuts 97, the inner end of this pin being adapted to engage with the laterally projecting arm 61. The rod 62 passes through this arm 61 and is held in place therein by means of a set screw 98. This permits the adjustment of the rod 62 with relation to the rack 58, and the stop pin 96 adjustably prevents or limits the movement of the rack bar to an extent which will just form the loops $b$ and $c$ and no more.

After the formation of the initial loops $b$ and $c$ it is necessary that the wire be bent at its middle and the two legs of the length of wire crossed so as to be in position for the final twisting of the wire and the formation of the helical shank. To this end I provide, rearward of the head 47 and midway between the axis of this head and the cutting knife 28, a reciprocating jaw carrying plate, illustrated in Fig. 11, and designated 99. This plate is best shown in Fig. 12. The plate is reciprocated by means of a cam, which will be later described, and to that end carries at its rear end a roller 100 which is engaged by the cam. Mounted upon the plate, in opposed relation to each other, are the jaws 101 and 102. These jaws are pivoted midway of their ends by means of screw pins 103, and the forward ends of the jaws extend beyond the plate 99 and are downwardly bent as at 104, the inner face of these downwardly bent ends being slightly curved, as at 105. As shown in Fig. 11, the side edges of the jaws forward of their pivotal point are cut out and concavely curved as at 106, and the downwardly turned ends of the jaws, as shown most clearly in dotted lines in Fig. 11, are recessed as at 107, this recess being approximately segmental in form.

Disposed between the downwardly projecting ends of the jaws 101 and 102, and formed upon the plate 99, is a lug 108, the upper face of which is beveled downward, and the end of this lug is formed with a laterally projecting tooth 109, this tooth being so disposed that it will engage over the end of the jaw 102 when the jaws are in the position shown in Fig. 12.

Disposed between the rear ends of the jaws is a contractile spring 110, which acts to force the rear ends inward and the forward ends of the jaws away from each other. For the purpose of actuating the jaws I provide pins 111 which extend downward from the plate 112, and which are spaced apart such a distance that as the slide 99 advances in the direction of the arrow, Fig. 11, the pins 111 will contact with the cam shoulders 113 formed on the jaws 102 and will force these jaws inward to the position shown in Fig. 12. The slide 99 is drawn rearward against the face of the cam 92 by any suitable means.

As before stated, the cam 92 carries upon it the lug 91 whereby the rock shaft 82 is actuated, but this cam is also formed upon its periphery so as to actuate the slide 99, as shown clearly in Fig. 12, and is so timed that the slide 99 advances as soon as the bend $c$ and the loop $b$ have been formed.

Coöperating with the jaws 102 is a mandrel, illustrated most clearly in Fig. 9 and designated 114. The lower end is reduced and passes through a collar 115 on an arm 116 mounted upon a rock shaft 117. The other end of this rock shaft has adjustably mounted upon it an arm 118 which extends upward and carries upon its upper end a roller 119 which bears against a cam face 120, formed preferably upon the cam 92. This cam face, as illustrated most clearly in Fig. 12, is formed at one point in its face with a depression 121. When this depression 121 coincides with the position of the roller 119, the roller will be caused to move inward by means of a spring or any other suitable mechanism to that end, and this will cause an instant depression of the mandrel 114. As soon as the depression 121 has passed beyond the roller 119, the roller will ride outward upon the face of the cam, and the mandrel 114 will be raised again into position immediately beneath the lug 108, as clearly illustrated in Fig. 11.

It will be seen from Fig. 12 that the downwardly turned ends 104 of the jaws project below the slide 99 and thus will be disposed in the position shown in Fig. 11, on each side of or at diametrically opposite points on the mandrel 114. The upper end of the mandrel 114 is preferably slotted as at 122 for the passage of a guide pin, and in order to avoid any shock caused by the upward movement of the mandrel the collar 115 is connected by means of a bracket 123 to the arm 116, and the stem or reduced end 124 of the mandrel passes loosely through the collar 115. A stem 125 is screw-threaded in the arm and is provided with a head at its lower end whereby it may be adjusted, and carries upon it a locking nut 126. It will thus be seen that the first movement of the arm 116 in a direction to carry the mandrel upward will be communicated to the spring 129 which is disposed between the collar 115 and the mandrel head 114, and that then the stem 125 will strike the shoulder 128 of the reduced portion of the mandrel and positively carry the mandrel upward.

With the mandrel in its raised position and the bend $c$ and the loop $b$ formed upon the extremity of the wire and the length of wire cut off, the operation of the slide 99 will be as follows:

Upon the forward movement of the slide in the direction of the arrow, Fig. 11, the inner faces of the jaws will act to bend the length of wire around the mandrel 114. When the ends of the jaws have passed the middle portion of the mandrel they will be brought together by the action of the spring 110 and take the position shown in Fig. 12, the recesses 107 receiving the rounded end of the mandrel. This will cause the legs of the angularly bent wire to cross each other, as illustrated in dotted lines in Fig. 11 and in full lines in Fig. 12, and the length of wire will now be in condition to have an initial twist formed upon it, whereby the two legs of the wire are connected to each other to form a handle loop and then have the shank of the wire twisted to provide the screw proper. This knotting of the intersecting ends of the wire, indicated by $d$ in Fig. 9, and the helical twisting of the shank is accomplished by means of the twisting head, illustrated most clearly in Fig. 5, but also shown in detail in Fig. 10.

Disposed upon the table 2 are the upwardly extending spaced pillar blocks 130 supporting the caps 131, within which is journaled a sleeve 132. This sleeve is formed with gear teeth 133 adapted to be engaged by the teeth upon the gear wheel 134. This gear wheel is mounted upon a shaft 135 journaled upon the base or table 2, and also mounted upon this shaft 135 is the gear wheel 136 which meshes with the gear wheel 6, which in turn is mounted upon the driving shaft 3, as previously described.

Mounted within the sleeve 132 is the tubular or hollow shaft 137 which projects at opposite ends beyond the sleeve 132 and which is keyed to the sleeve by means of the key or spline 138, the shaft 137 being grooved as at 140 to accommodate this spline. It will therefore be seen that the tubular shaft 137 may be longitudinally shifted with relation to the sleeve 132, but will be rotated by said sleeve.

Disposed within the tubular shaft 137 at the rear end thereof, is a tubular shank 142 of the twisting head 143. This twisting head is held in position upon the shaft 137 by the set-screw 144, and the rear end of the head 143 is spaced from the forward end of the shaft 137 to accommodate a shipper collar 145 (see Figs. 2 and 10), there being ball bearings disposed between the shipper collar and the shank 142. This shipper collar is to be provided with the oppositely disposed studs 146 which engage in slots in the extremities of a bifurcated shipper lever 147, which is automatically operated in a manner which will be later described.

Disposed within the tubular shank 142 and extending entirely through the tubular shaft 137 is a shaft or mandrel 148, the forward extremity of which is screw threaded as at 149 or formed like an auger. This shaft extends through the rear end of the sleeve or tubular shaft 137 and through the plug 141 and is provided intermediate its ends with an adjustable collar 150 held in place upon the shaft by a set-screw or other suitable means, and disposed between this collar and the plug 141 is the helical spring 151 which acts to hold the tapered end of the member 137 in engagement with a socket formed in a clutch member 152. Mounted upon the projecting end of the rod 148 is the clutch member 152 which is held to the rod by means of a set screw 153, and the forward end of which is formed with a clutch recess 154 having a beveled side wall which coacts with the beveled end 155 of the shaft 137. It will now be seen that normally the clutch member 152 and the shaft 137 will rotate together through the frictional engagement between the rear end of the shaft 137 and the clutch member, but that if the clutch member be held from rotation the shaft 137 will rotate independently so as to rotate the head 143 without rotating the mandrel 148.

For the purpose of preventing the rotation of the clutch member 152 and therefore preventing the rotation of the mandrel while permitting the continued rotation of the shaft 137, I provide a detent or pawl 156 which is mounted upon an arm 157 pivotally supported upon the table 2 by means of a bolt 158 which passes through a slot 159 formed in the lower end of the arm. This arm, as illustrated, is twisted at its upper end so that the upper end of the arm lies parallel to the axis of the clutch member, and riveted to this upper end is the detent 156. Passing through the upper end of the arm 157 is a rod 160 which is provided with a stop collar 161 and with a collar 162. A coiled spring 163 surrounds this rod and bears at one end against the collar 162 and at its other end against the arm 157, holding this arm against the stop collar but permitting the inward movement of the arm. The rod 160 is pointed rearward and, as illustrated in Fig. 1, is operatively connected to a crank pin 164 mounted upon a crank disk 164 carried by the shaft 135. Thus an oscillating movement will be given to the arm 157 and the pin carried thereby which will bring it intermittently into the path of movement of a lug 165 projecting from the clutch member 152.

The shaft 137 together with the head 143 is reciprocated by means of a cam 166, illustrated in detail in Fig. 15. This cam is mounted upon the shaft 3. The shipper lever 147 is pivoted intermediate of its ends and carries on its extremity a roller which bears against the cam 166. The cam 166 is formed with a central hub and a peripherally elevated cam track, the face of which bears against the roller on the lever 147. This cam track, as illustrated in Fig. 15, is formed for a portion of its length with a relatively flat portion 168, and this gradually rises as at 169 to a crest 170, then extends for a certain distance as at 171 approximately parallel to the rear face of the cam, and then suddenly drops as at 172, this drop being, however, relatively slight. The cam face then extends for a relatively long distance approximately parallel to the rear face of the cam as at 173, to a point 174, when it commences to gradually rise to a crest 175 and then drops rapidly as at 176 to the beginning of the portion 168. When the portion 168 is in contact with the roller of the lever 147 the shaft 137 is stationary. When the portion 169 is reached in the travel of the cam the shaft 137 is moved outward until at the point 170 the head 143 is projected beyond the mandrel 148. At the slightly depressed drop 172 the head 143 shifts quickly back just so far as to cause the stud 177 and the forward end of the head to be carried rearward of the point of the mandrel 148. During the travel of the shipper lever roller over the face 173 the shaft 137 and the head 143 are simply rotated, the parts being in the position shown in Fig. 10. During the time that the shipper lever roller is in contact with the portion 174 of the cam face the mandrel 148 is rotated with the shaft 137, and this common rotation of the mandrel 148 and the head 143 is continued during the receding movement of the head due to the shipper lever roller traveling over the face 176. This disengages the mandrel from the shank of the corkscrew and leaves the parts in the position shown in Fig. 2.

Assuming that the complete corkscrew has now been formed, it is necessary to provide means for detaching it from the mandrel or former 114 and ejecting the complete corkscrew. As soon as the corkscrew is completed by the means heretofore described, the rock shaft 117 is rocked by means of the cam 120, the roller 119 dropping into the recess 121, and this carries downward the mandrel 114 and at the same instant the ejector 178 is oscillated. This ejector comprises an angular lever, one end 179 of which extends downward, as illustrated most clearly in Fig. 2, so as to form a finger which is disposed behind the loop c of the completed corkscrew. This finger at its rear edge is cut away so as to permit it to shift rearward, and the angular ejector lever 178 is pivoted upon a post at 180 projecting upward from the plate 112. The rear end of the ejector is pivotally connected as at 181 to a link 182 which extends diagonally forward and laterally and is mounted upon the upper end of a post 183 which extends up from the lever 184. This lever 184 is pivoted intermediate its ends as at 185, and at its rear end is pivotally connected by means of a stud bolt 186 to the post 42 projecting upward from the slide plate 29 (see Figs. 4 and 8). It will thus be seen that upon a forward movement of the knife 28 carried upon the plate 29 the lever 184 will be oscillated, which will pull upon the link 182 and cause an oscillation of the ejector 178. A spring 187 returns the knife to its rearward position after its actuation by the cam 31 and this will cause the return of the ejector 178 to a position to engage the next corkscrew made. The completed corkscrews are ejected into a chute 188 carried upon the table at a point approximately beneath the twisting head 143.

In order to keep the arm $c$ in its proper position when it is being twisted around the shank portion to form the bend $e$ I provide a guide plate 189, which is illustrated in Fig. 2 as mounted upon the edge of the table and has one end spaced from the edge of the table as at 190. The extremity of this end is deflected as at 191. Now when the twisting head forms the bend $e$ of the corkscrew the portion $c$ of the screw will sweep around in a circle, and entering between the deflected end 191 and the edge of the table, will be bent and kept in a plane at right angles to the axis of the shank.

The general operation of the invention is as follows: As before stated, the wire $a$ is straightened by the rolls 8 and is intermittently fed forward by the reciprocation of the slide 12. When a length of wire has been fed forward the forward end of the wire will be received between the studs 56 and 57 on the roll 43 and the forward end of the wire will be bent to form the terminal end $b$ and the arm $c$, as shown clearly in Fig. 2. While this is happening the previously formed corkscrew has been completed, as shown in Fig. 2, and is ready for ejection. As soon as the rolls 43 and 46 have completed their work of forming the bends $b$ and $c$ the knife 28 is projected, cutting off a length of wire, and at the same time the ejector 178 operates to eject the formed corkscrew. As soon as the bends $b$ and $c$ are formed the slide 29 shifts forward carrying the jaws against the wire, as shown in Fig. 11, and cause it to take the position shown in dotted lines in Fig. 11. As soon as this has been done the twister head 143 advances, the mandrel 148 being held stationary, and the stud 177 engages with the leg or arm $c$ of the wire. The rotation of the head 143 carries this leg $c$ around that portion of the wire which is to form the shank of the corkscrew, and this forms the bend $e$. As soon as this bend $e$ has been formed the twister head 143 drops back so that the stud 177 just clears the extremity of the mandrel 148. The hooked end of the mandrel 148 is at this time engaged with the shank portion of the corkscrew. The mandrel 148 being held from rotation and the head 143 rotated, it will be obvious that the wire forming the shank will be carried around in the helices of the mandrel and bent to form the corkscrew proper. When this has been completed the clutch member 152 is released from its engagement with the detent 156 and thus the mandrel 148 will be caused to revolve with the shaft 137 and the head 143, and at the same time the head 143 and the mandrel are moved rearward, thus disengaging the helical groove 149 of the mandrel from the shank of the corkscrew until the shank is entirely clear. At this time the parts are in the position shown in Fig. 2 and the ejector 178 operates to eject the completed corkscrew, while at the same time a new length of wire is cut.

While I have illustrated what I believe to be the preferable details of my construction, and have shown and described a machine which is thoroughly effective for the purpose intended, I do not wish to be limited to all of the details of construction, as it is obvious that many of these may be changed without departing from the principle of the invention.

Having described my invention, what I claim is:

1. In a machine for forming corkscrews, means for feeding a length of wire forward, means for bending one end of the length to form a curved arm and simultaneously bending the extremity of said arm upon itself, means for forming a handle loop at the base of the arm for forming a shank, and means for bending the shank helically to form the screw.

2. In a machine for making corkscrews, means for feeding a wire forward a predetermined distance, means for cutting a length from the wire, means for bending one end of the length of wire to form a curved arm, means for forming a separate handle loop at the base of the arm for forming a shank, and means for bending the shank helically to form the screw.

3. In a machine for forming corkscrews, means for feeding forward a continuous piece of wire, means for cutting off a length from said piece, means for bending one end of the length to form a curved arm, means for then forming the handle loop at the base of the arm and forming a shank, means for turning the arm around the shank at the base of the handle loop, and means for bending the shank helically to form the screw.

4. In a machine for forming corkscrews, a loop mandrel, means for feeding a length of wire to a position with an intermediate portion of the wire against the mandrel, successively acting means for bending one end of the length of wire to form a curved arm, and successively acting loop-forming and shank-forming means.

5. In a machine of the character described, a loop mandrel, a wire bending mechanism disposed in advance of the loop mandrel, means for feeding forward a length of wire to bring one end into engagement with the bending device and an intermediate portion of the wire against the mandrel, means for then actuating the bending device to bend the end portion of the wire to form a curved arm, means for then forcing the wire around the mandrel to provide a loop and crossed arms, and successively acting means for twisting said arms into engagement with each other and helically bending one of said arms.

6. In a machine of the character described, a loop mandrel, a wire bending mechanism disposed in advance of the loop mandrel and operating at right angles thereto, means for intermittently feeding the wire forward to carry its end into engagement with the loop forming and wire bending mechanism, means rearward of the mandrel for cutting off a length of wire, means for detaching the length of wire from its engagement with the wire bending mechanism, means acting to bend the wire around the mandrel to form a loop and cross the end portions of the wire, and means then acting to twist the end portions of the wire upon each other and to helically bend one of the end portions of the wire to form a corkscrew shank.

7. In a machine of the character described, a wire bending mechanism including a pair of members, one rotatable upon its own axis and also rotatable around the axis of the other, the last-named member having means for engaging the end of a wire, and an arcuate mandrel disposed at the end of and rotatable with the other member.

8. In a mechanism of the character described, wire bending means comprising a pair of toothed intermeshing members, one of said members being held from rotation and the other being rotatable upon its own axis and rotatable around the first-named member, the last-named member being provided with projecting spaced wire engaging studs upon its face, and a mandrel disposed concentrically to the axis of the first-named member, and around which the wire is bent by the second-named member.

9. In a mechanism of the character described, wire bending means comprising a rotatable housing, a pair of toothed intermeshing rolls disposed in said housing, one of said rolls being disposed at the axis of the housing and the other eccentrically thereto, the last-named roll being provided upon its face with a pair of wire engaging studs, said housing carrying upon its end face an arcuate mandrel disposed concentrically to the first-named roll.

10. In a mechanism of the character described, a pair of intermeshing rolls, one rotatable upon its own axis and also rotatable around the other roll, the last named roll being provided with a pair of spaced studs projecting from its end, a mandrel disposed concentrically to the other roll, means for rotating said mandrel and the first named roll around the axis of the second named roll, and means for stripping the bent wire from its engagement with said studs.

11. In a machine of the character described, a wire bending mechanism comprising a rotatable housing having a concentrically disposed bearing seat, a mandrel rib surrounding the concentrically disposed seat and disposed at the end of the housing, a pair of intermeshing rolls disposed in said seats, the end of the eccentric roll being formed with a pair of projecting spaced wire engaging studs, one of said studs being disposed at the axis of the roll and being circular in form, means for feeding the end of a length of wire into position between said studs, means for rotating the housing to carry the eccentric roll to thereby bend the extremity of the wire upon itself and carry the wire around said mandrel, and means then acting to strip the wire from the studs and from said mandrel.

12. In a mechanism of the character described, a wire bending mechanism comprising a rotatable housing having an axial seat and an eccentric seat, an arcuate mandrel rib surrounding the axial seat, a pair of rolls disposed in said seats and intermeshing with each other, the eccentric roll being provided at its end with a pair of projecting spaced studs disposed in the plane of said mandrel, means for feeding a wire forward to insert its end between said studs, means then acting to rotate the housing to a predetermined distance to bend the end of the wire, means for cutting off the length of wire bent, and means for detaching the wire from its engagement with said studs and mandrel.

13. In a mechanism of the character described, wire bending means including a rotatable housing having an axial seat and an eccentric seat, rolls mounted in said seats and intermeshing with each other, the eccentric roll being provided at its end with a pair of spaced wire engaging studs and the housing being provided with a gear wheel, a rack bar engaging said gear wheel, reciprocating wire feeding means adapted to feed the end of the wire into position between said studs, successive acting means for actuating said rack bar, to thereby rotate the housing to a predetermined angular distance to bend the end of the wire, means for cutting off the wire so bent, and means for detaching the wire from its engagement with the studs and said mandrel.

14. In a mechanism of the character described, means for bending wire comprising a rotatable housing having an axial and an eccentric roll seat, intermeshing rolls disposed in said seat, the eccentric roll being provided upon its end with a pair of spaced roll-engaging studs, the end of the housing being formed with a mandrel concentric to the axial roll, a gear wheel mounted upon said housing, a rack bar engaging with said gear wheel, a reciprocable wire-engaging slide adapted to intermittently feed a length of wire forward, means actuated by said slide for reciprocating the rack-bar, means actuated upon the movement of the rack-bar in one direction to cut off a length of bent wire, means then acting to detach the bent wire from engagement with the studs and mandrel, and means acting to return the housing to its original position.

15. In a mechanism of the character described, a pair of intermeshing rolls, one of said rolls being rotatable upon its own axis and traveling around the axis of the other roll and being provided at one end with a pair of projecting wire engaging studs, a mandrel concentric to the fixed roll and around which the wire is carried by the rotation of the traveling roll, means for carrying the traveling roll around the fixed roll, and means for detaching the wire from its engagement with the studs and said mandrel comprising a blade insertible into position between the wire and the face of the traveling roller.

16. In a mechanism of the character described, a pair of intermeshing rolls, one of said rolls being rotatable upon its own axis and traveling around the axis of the other roll and being provided at one end with a pair of projecting wire engaging studs, a mandrel concentric to the fixed roll and around which the wire is carried by the rotation of the traveling roll, means for detaching the wire from its engagement with the studs and said mandrel comprising a pivoted blade having a beveled edge insertible into position between the wire and the face of the traveling roll, and means for reciprocating said blade.

17. In a mechanism of the character described, a pair of intermeshing rolls, one of said rolls being rotatable upon its own axis and traveling around the axis of the other roll and being provided at one end with a pair of projecting wire engaging studs, a mandrel concentric to the fixed roll and around which the wire is carried by the rotation of the traveling roll, means for detaching the wire from its engagement with the studs and said mandrel, said means comprising a blade pivoted intermediate its ends and having a beveled edge adapted to be inserted between the wire and the face of the traveling roll, means for raising the active end of the blade, and means for depressing said active end to detach the wire, and comprising a rotatable shaft and an eccentric stud mounted upon the shaft and engaging the upper edge of the blade.

18. In a mechanism of the character described, bending means comprising a housing having a gear wheel and having an axial roll seat and an eccentric roll seat, a pair of intermeshing rolls disposed in said seats, the eccentric roll rotating upon its own axis and simultaneously traveling with a rotation of the housing around the axial roll, an arcuate mandrel formed upon the end of the housing and surrounding the axial roll, a pair of studs projecting from the end of the traveling roll and adapted to engage the wire between them, a rack-bar engaging said gear wheel, an arm connected to the rack-bar and extending rearward, means normally holding the rack-bar in a retracted position, a reciprocating wire feeding slide having means thereon for gripping a wire upon a movement of the slide toward the twisting means but releasing the wire upon the rearward movement of the slide, said slide engaging a rod to force the rod and rack-bar forward upon the forward movement of the wire-feeding slide, means actuated after a rotation of the wire bending means to a predetermined angular distance acting to cut the bent portion of the wire from the main body thereof, and means simultaneously acting to detach the bent wire from its engagement with the traveling roll and mandrel.

19. In a mechanism of the character described, wire bending means including a rotatable housing, a roll concentric to the axis of the housing, and a roll eccentric thereto and meshing with the first-named roll, the second-named roll having a pair of spaced wire engaging studs projecting from its face, the end of the housing being formed with an arcuate mandrel over which the wire engaged by said studs is bent, means for feeding the end of a length of wire between said studs, means acting to rotate the housing to cause the wire to bend around the mandrel, means for cutting the bent wire from the main body of the wire, means for detaching the bent wire from its engagement with the studs and mandrel, and means for returning the housing to its original position, including a cam, a keeper plate spaced from the cam, and a member having a roller disposed in a plane between the keeper plate and the cam and engageable by the cam and plate.

20. In a mechanism of the character described, wire cutting means including a reciprocating plate, recessed at one corner, and a cutting blade removably disposed against the said recessed portion of the plate and reversible with relation to the plate, the extremity of said blade having two reversely inclined cutting edges disposed on opposite faces of the blade and in diagonally opposite relation to each other.

21. In a mechanism of the character described, wire cutting means comprising a reciprocating sliding plate having a rectangular recess at one corner of its forward end, one wall of said recess being formed with a laterally projecting rib, and a cutting blade having a shank portion provided at its opposite edges with recesses adapted to receive said rib, the end of the blade being oppositely beveled at its corners to provide oppositely disposed wire cutting edges, said blade being thereby reversible with relation to the plate.

22. In a mechanism of the character described, a vertically reciprocatable loop forming mandrel, a slide movable toward and from said mandrel, oppositely disposed jaws carried upon said slide, the extremities of said jaws being formed with concave recesses adapted to embrace the mandrel, means for reciprocating the slide to bring the jaws into operative engagement with the mandrel, means acting upon a reciprocation of the slide to press the jaws against the mandrel, and means for feeding a length of wire between said jaws and the mandrel.

23. In a mechanism of the character described, a vertically reciprocatable loop forming mandrel, a pair of jaws movable toward or from engagement with the mandrel and having depending ends formed with concave recesses adapted to embrace the mandrel, means for feeding a length of wire into position between the mandrel and said jaws, means for moving the jaws forward to bend the wire around the mandrel and simultaneously force the jaws toward each other to cross the ends of the length of wire upon each other, to thereby form a loop, means for depressing the mandrel, and means for ejecting the looped wire from its engagement with said jaws.

24. In a mechanism of the character described, a vertically reciprocatable mandrel, a slide movable toward or from the mandrel, a pair of jaws pivotally mounted upon said slide and having ends depending over the edge of the slide, the ends being formed with concave recesses adapted to embrace the mandrel, means for shifting the slide to bring the ends of the jaws into engagement with the mandrel, and means for forcing the jaws toward the mandrel, comprising fixed studs engageable with the side edges of the jaws.

25. In a mechanism of the character described, a mandrel, a slide movable toward or from the mandrel, a pair of jaws pivoted upon the slide and having ends depending below the slide, said ends being formed with concave recesses adapted to embrace the mandrel, means for feeding a length of wire between the jaws and the mandrel, means for forcing the slide toward the mandrel, means for forcing the bent ends of the jaws toward each other and against the mandrel, said means comprising fixed studs depending into the path of travel of the jaws, the jaws being formed with cam faces adapted to engage said studs, and means for shifting the mandrel out of the plane of said jaws after the loop has been formed by the jaws, and means for ejecting the looped wire from its engagement with the jaws.

26. In a mechanism of the character described, a vertically reciprocatable mandrel, means for feeding a length of wire upon said mandrel, means for forcing the wire around the mandrel, means for vertically reciprocating the mandrel, and a cushioning spring disposed between the mandrel and said means.

27. In a mechanism of the character described, a vertically disposed mandrel having a reduced lower portion, an oscillatable arm through which the reduced portion of the mandrel passes loosely, a bracket supported upon said arm and having a collar through which the reduced portion of the mandrel passes, and a cushioning spring disposed between the head of the mandrel and said collar.

28. In a mechanism of the character described, a vertically reciprocatable loop forming mandrel, an actuating rock shaft therefor, an arm mounted upon the rock shaft and loosely carrying the mandrel, a spring supporting the mandrel on said arm, an arm on the other end of the rock shaft carrying the roller, and a cam for operating said roller.

29. In a mechanism of the character described, a mandrel, oppositely disposed jaws movable into engagement with the mandrel to bend a wire around the mandrel, an ejecting finger extending downward upon the front of the mandrel and behind said jaws, and means for oscillating said finger after the loop has been formed upon the mandrel.

30. In a mechanism of the character described, a vertically reciprocatable mandrel, means for feeding a length of wire behind the mandrel, a pair of reciprocable jaws movable into position on each side of the mandrel to fold the wire around said mandrel, a finger extending downward beside said jaws and in front of the mandrel, means for bending the shank of the wire helically to form a corkscrew, and means for then actuating the finger to eject the finished corkscrew from engagement with the jaws.

31. In a mechanism of the character described, a table, means for feeding a length of wire along the face of the table, a mandrel disposed in front of said table and vertically reciprocatable, a slide movable upon the face of the table and having a centrally disposed tongue adapted to engage over the middle portion of said wire upon a forward stroke of the slide, jaws having downwardly depending ends and pivotally mounted upon said slide, the inner faces of said jaws being concavely recessed to embrace the mandrel, the depending ends of the jaws being disposed on each side of said tongue, means for forcing the jaws inward as the slide is moved forward, thereby to bend the length of wire around the mandrel and cross its ends, means for twisting the ends of the wire together and helically bending one end of the wire to form a corkscrew shank, means for depressing the mandrel after the corkscrew has been formed, and means for ejecting the finished corkscrew from engagement between the table and said tongue.

In testimony whereof I hereunto affix my signature in the presence of two witnesses.

HARRY R. McCONNELL.

Witnesses:
W. H. McCONNELL,
SOL. L. CLARKE.

Copies of this patent may be obtained for five cents each, by addressing the "Commissioner of Patents, Washington, D. C."